(12) United States Patent (10) Patent No.: US 12,644,512 B1
Bahena (45) Date of Patent: Jun. 2, 2026

(54) OIL REDIRECTION CATCHER FOR AXLE ASSEMBLY

(71) Applicant: Schaeffler Technologies AG & Co. KG, Herzogenaurach (DE)

(72) Inventor: Rodrigo Bahena, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/966,233

(22) Filed: Dec. 3, 2024

(51) Int. Cl.
  *F16H 57/04* (2010.01)

(52) U.S. Cl.
  CPC ..... *F16H 57/0423* (2013.01); *F16H 57/0424* (2013.01); *F16H 57/043* (2013.01); *F16H 57/0476* (2013.01)

(58) Field of Classification Search
  CPC .......................... F16H 57/0423; F16H 57/0426
  See application file for complete search history.

(56) References Cited

U.S. PATENT DOCUMENTS

| | | | | |
|---|---|---|---|---|
| 1,143,307 | A * | 6/1915 | Noyes | F16H 57/0421 |
| | | | | 184/11.1 |
| 5,821,653 | A * | 10/1998 | Kinto | B60K 1/00 |
| | | | | 310/58 |
| 9,103,432 | B2 * | 8/2015 | Isomura | F16H 57/0427 |
| 11,085,522 | B2 | 8/2021 | Pritchard et al. | |
| 11,578,797 | B2 | 2/2023 | Friedrichshafen | |
| 2008/0044276 | A1 | 2/2008 | McCune | |
| 2019/0301591 | A1 | 10/2019 | Pritchard et al. | |
| 2022/0221047 | A1 | 7/2022 | Friedrichshafen | |

* cited by examiner

*Primary Examiner* — Jake Cook

(57) ABSTRACT

An oil redirection catcher includes a planar portion, an aperture arranged in the planar portion, first and second edge portions extending from the planar portion, an arcuate edge portion, and a first tab portion arranged to fix the oil redirection catcher to an axle housing. The second edge portion, together with the first edge portion and the planar portion, forms a channel. The arcuate edge portion connects the first edge portion and the second edge portion, delimits the channel, and at least partially surrounds the aperture. In an example embodiment, the first edge portion is longer than the second edge portion. In an example embodiment, the channel narrows towards the aperture.

12 Claims, 3 Drawing Sheets

OIL REDIRECTION CATCHER FOR AXLE ASSEMBLY

TECHNICAL FIELD

The present disclosure relates generally to an axle assembly, and more specifically to an oil redirection catcher for an axle assembly.

BACKGROUND

U.S. Pat. No. 11,578,797 titled DEVICE FOR COOLING AND LUBRICATING COMPONENTS OF A VEHICLE AND DRIVE DEVICE HAVING A DEVICE OF THIS TYPE to Roske describes a device for cooling and lubricating components of a vehicle having first and second coolant pumps. U.S. Pat. No. 11,085,522 titled GRAVITY-FED LUBRICATION SYSTEM WITH DISCONNECT FRONT AXLE to Pritchard et al. includes an Archimedes' screw pump for delivering lubricant to a secondary reservoir system.

SUMMARY

Example aspects broadly comprise an oil redirection catcher including a planar portion, an aperture arranged in the planar portion, first and second edge portions extending from the planar portion, an arcuate edge portion, and a first tab portion arranged to fix the oil redirection catcher to an axle housing. The second edge portion, together with the first edge portion and the planar portion, forms a channel. The arcuate edge portion connects the first edge portion and the second edge portion, delimits the channel, and at least partially surrounds the aperture. In an example embodiment, the first edge portion is longer than the second edge portion. In an example embodiment, a height of the first edge portion is equal to a height of the second edge portion. In an example embodiment, at least a portion of the first tab portion is joined to the arcuate edge portion. In an example embodiment, the channel narrows towards the aperture.

In some example embodiments, the oil redirection catcher also includes a rounded section extending from the first edge portion and the planar portion. In an example embodiment, the oil redirection catcher also includes second tab portion arranged to fix the oil redirection catcher to the axle housing. At least a portion of the second tab portion extends from the rounded section. In an example embodiment, the oil redirection catcher is formed by plastic injection molding.

Other example aspects broadly comprise an axle assembly including an axle housing with an oil passage having an inlet, and the oil redirection catcher fixed to the axle housing and arranged to direct oil through the aperture and into the inlet. In an example embodiment, the axle assembly also includes a sump for collecting the oil, and a portion of the oil redirection catcher is disposed in the sump.

In some example embodiments, the axle assembly also includes a drive gear, and rotation of the drive gear in a first rotational direction is arranged to direct the oil into the channel. In an example embodiment, a portion of the planar portion overlaps a portion of the drive gear. In an example embodiment, the oil redirection catcher also includes a rounded section extending from the first edge portion and the planar portion that partially surrounds the drive gear. In an example embodiment, the drive gear comprises an internal spline arranged for driving connection with an axle shaft.

In some example embodiments, the oil passage includes an outlet, and, when the axle assembly is installed in a vehicle, the outlet is lower than the inlet. In an example embodiment, the axle assembly also includes an electric motor. The electric motor includes a rotor with a hollow shaft, and the outlet is aligned with the hollow shaft such that the oil is directed into the hollow shaft.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
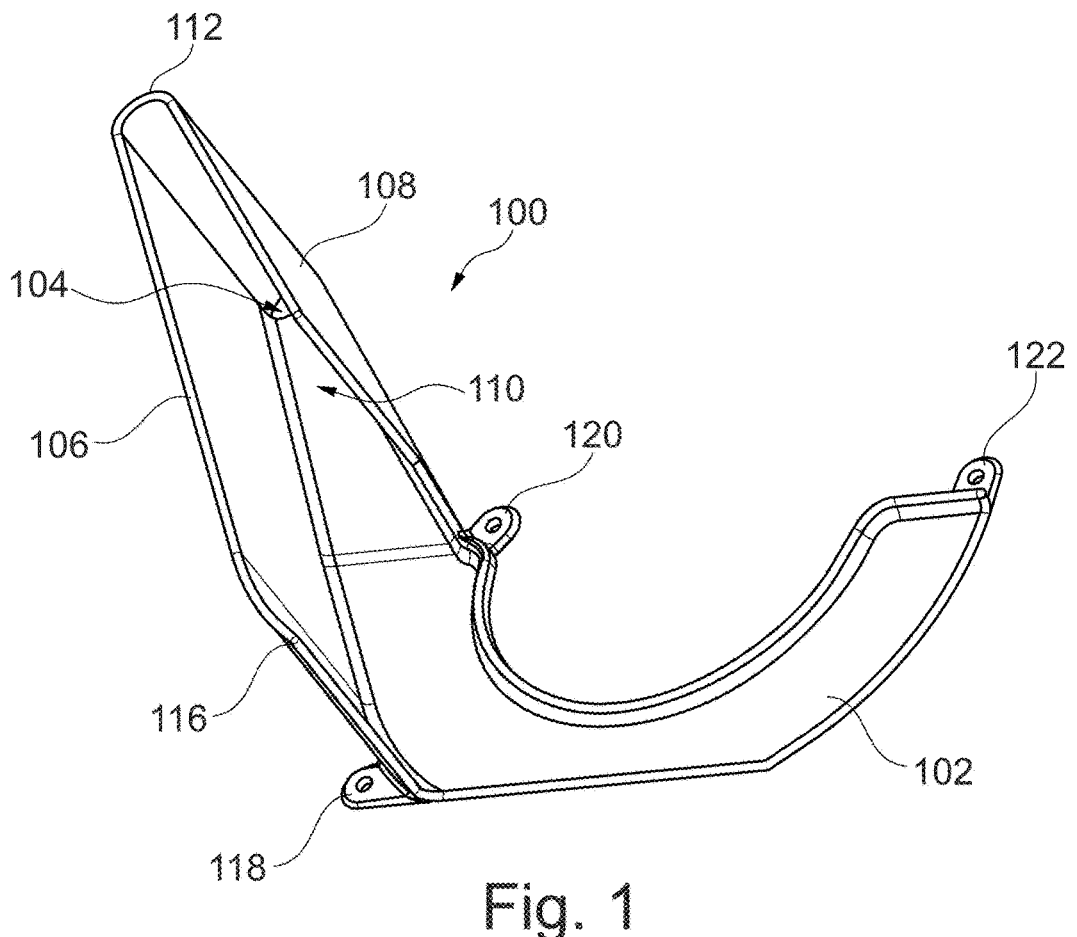
FIG. 1 illustrates a perspective view of an oil redirection catcher according to an example embodiment.
Figure 2:
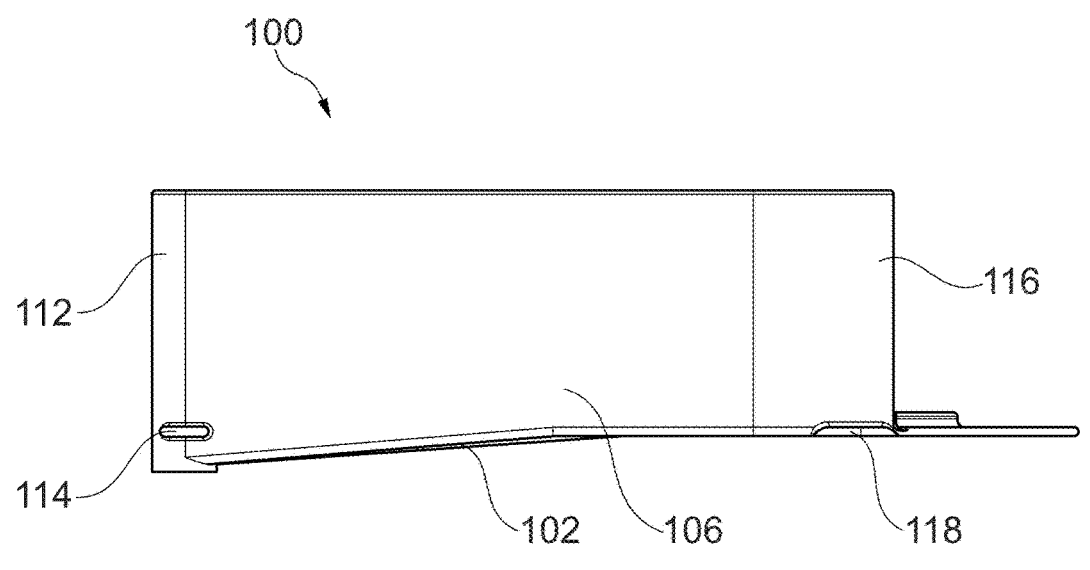
FIG. 2 illustrates a side view of the oil redirection catcher of FIG. 1.
Figure 3:
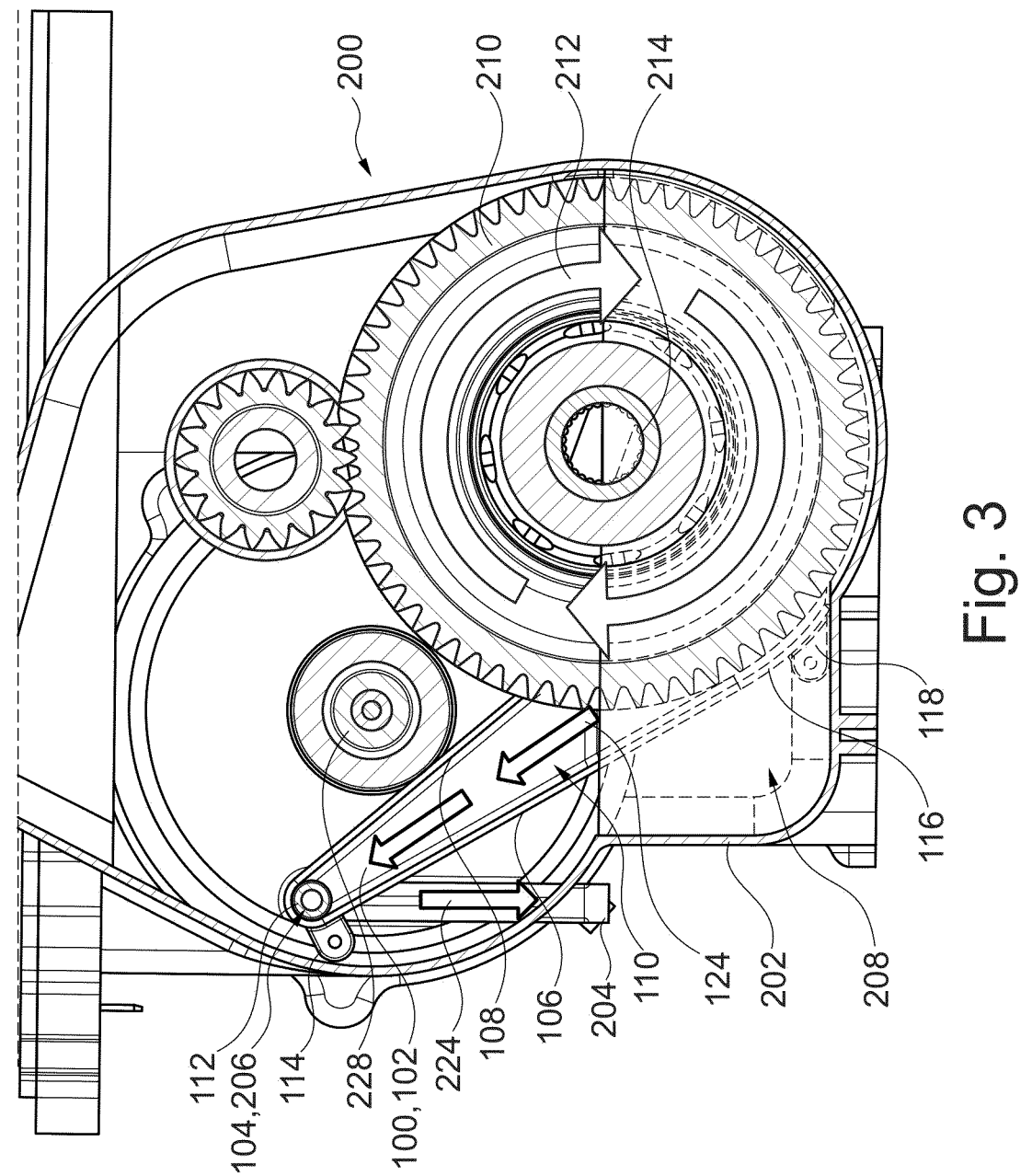
FIG. 3 illustrates an end view of an axle assembly including the oil redirection catcher of FIG. 1 with a housing cover removed.

The following description is made with reference to FIGS. 1-3. FIG. 1 illustrates a perspective view of oil redirection catcher 100 according to an example embodiment. FIG. 2 illustrates a side view of oil redirection catcher 100 of FIG. 1. FIG. 3 illustrates an end view of axle assembly 200 including oil redirection catcher 100 of FIG. 1 with a housing cover removed. Oil redirection catcher 100 includes planar portion 102, aperture 104, arranged in the planar portion, edge portion 106 extending from the planar portion and edge portion 108 extending from the planar portion and, together with edge portion 106 and planar portion 102, forming channel 110. Oil reduction catcher 100 also includes arcuate edge portion 112 and tab portion 114 for fixing the oil reduction catcher to an axle housing (e.g., axle housing 202 described below). The arcuate edge portion connects edge portions 106 and 108 to delimit channel 110, and partially surrounds aperture 104.

As best shown in FIG. 3, for example, edge portion 106 is longer than edge portion 108. And as shown in FIGS. 1 and 2, for example, a height of edge portion 106 is equal to a height of edge portion 108. As can be seen in FIGS. 2-3, for example, a portion of tab portion 114 is joined to arcuate edge portion 112. As best shown in FIG. 3, channel 110 narrows towards aperture 104. Oil reduction catcher 100 also includes rounded section 116 extending from edge portion 106 and planar portion 102, and tab portion 118 for fixing the oil redirection catcher to the axle housing. As shown in FIGS. 1 and 3, for example, a portion of tab portion 118 extends from the rounded section. Oil redirection catcher 100 may be formed by plastic injection molding, for example.

Oil redirection catcher 100 also includes tab portions 120 and 122, also arranged for fixing the catcher to the axle housing. Although tab portions 114, 118, 120 and 122 are shown with holes for receiving fasteners for fixing the oil redirection catcher to the axle housing, other types of fixing methods are possible. For example, in an alternative embodiment (not shown), the tabs may include a snap-fit feature for securing the catcher to the oil housing.

Figure 4:
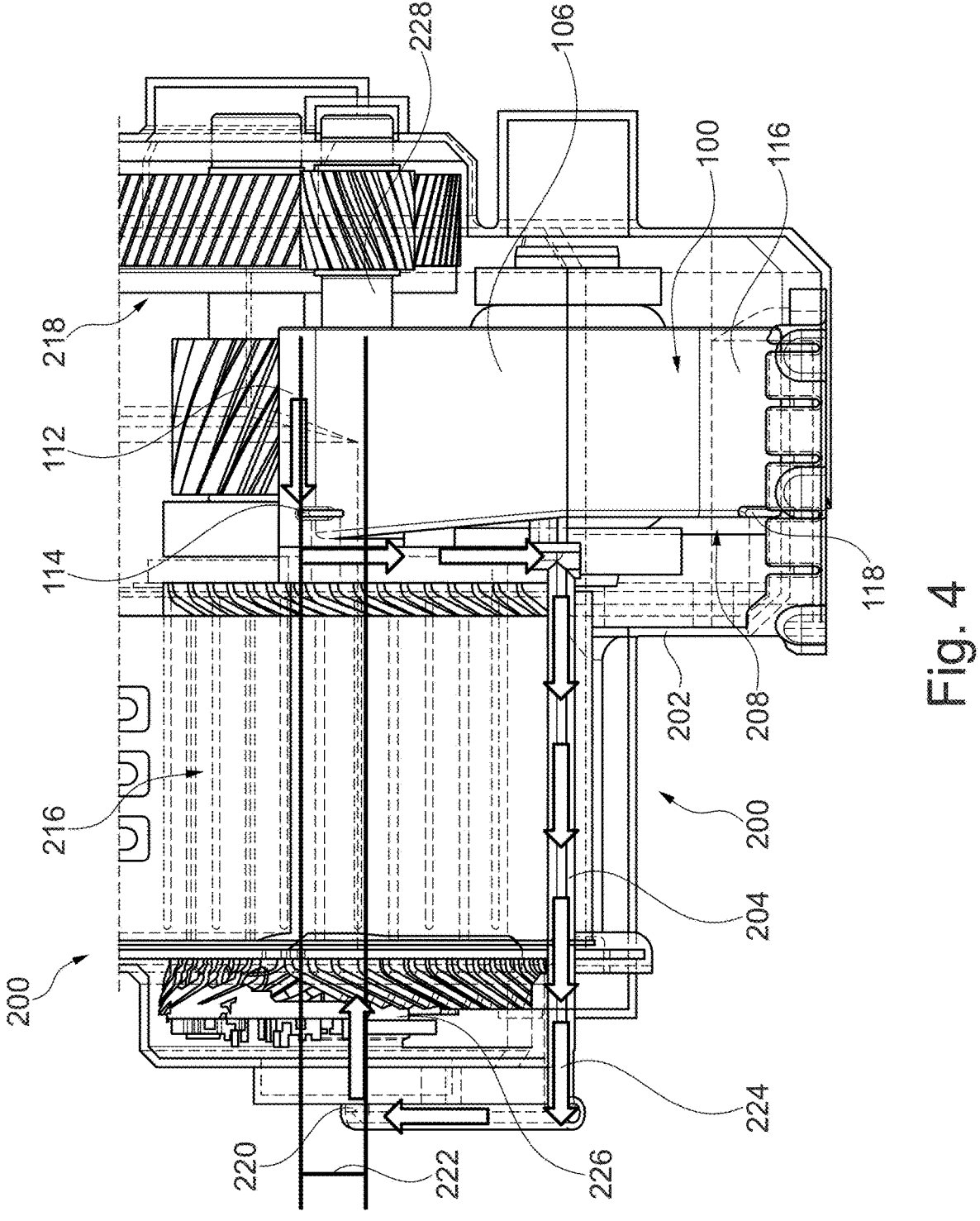
FIG. 4 illustrates a cross-sectional view of the axle assembly of FIG. 3 showing an oil flow path.

The following description is made with reference to FIGS. 1-4. FIG. 4 illustrates a cross-sectional view of axle assembly 200 of FIG. 3 showing an oil flow path. Axle assembly 200 includes axle housing 202 with oil passage 204 having inlet 206, and oil redirection catcher 100 fixed to the axle housing and arranged to direct oil through aperture 102 and into inlet 206. Axle assembly 200 also includes sump 208 for collecting the oil. As shown in FIG. 3, for example, a portion of the oil catcher (e.g., a portion of planar portion 102 and edge portion 106, and an entirety of rounded section 116 and tab portion 118) is disposed in the sump.

Axle assembly 200 includes drive gear 210. Rotation of the drive gear in a first rotational direction (as indicated by arrows 212 in FIG. 3, for example) is arranged to direct the oil into channel 110. That is, during operation of the axle assembly, rotation of the drive gear flings oil up channel 110 as indicated by arrows 124, for example. In other words, when the teeth of the drive gear pass through the oil sump, some oil is pushed by the teeth into the channel. This effect is greater (e.g., more oil is moved) with greater rotational speed of drive gear 210, and less with slower rotational speed or reverse rotational speed (opposite the first rotational direction, for example) of the drive gear.

As is apparent from FIG. 3, for example, a portion of planar portion 102 overlaps a portion of the drive gear and rounded section 116 partially surrounds the drive gear. Rounded section 116 wraps closely to the drive gear to increase the amount of oil transferred from the drive gear into the channel. Drive gear 210 includes internal spline 214 arranged for driving connection with an axle shaft (not shown). That is, axle assembly 200 is an axle assembly for a vehicle (not shown) and the axle shaft is connected to a drive wheel for propelling the vehicle. As shown in the figures, for example, axle assembly 200 is an electric axle with electric motor 216 and geartrain 218 drivingly engaged with the drive gear.

Oil passage 204 includes outlet 220. When the axle assembly is installed in a vehicle (as shown in FIG. 4, for example), outlet 220 is lower than inlet 206 by distance 222. Thus, once the drive gear sends oil up channel 110 into oil passage inlet 206, gravity and hydrostatic pressure force the oil through the remainder of oil passage 204 towards outlet 222, as indicated by arrows 224 in FIG. 4. Electric motor 216 includes rotor 226 with hollow shaft 228 and the outlet is aligned with the hollow shaft such that the oil is directed into the hollow shaft. Once oil enters the shaft, rotation of the electric motor radially disperses the oil to lubricate and/or cool various components of the axle assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Oil redirection catcher
102 Planar portion
104 Aperture
106 Edge portion (first)
108 Edge portion (second)
110 Channel
112 Arcuate edge portion
114 Tab portion (first)
116 Rounded section
118 Tab portion (second)
120 Tab portion
122 Tab portion
124 Arrows (oil path)
200 Axle assembly
202 Axle housing
204 Oil passage
206 Inlet (oil passage)
208 Sump
210 Drive gear
212 Arrows (first rotational direction)
214 Internal spline (drive gear)
216 Electric motor
218 Geartrain
220 Outlet (oil passage)
222 Distance (inlet to outlet)
224 Arrows (oil path)
226 Rotor (electric motor)
228 Hollow shaft

What is claimed is:
1. An oil redirection catcher, comprising:
a planar portion;
an aperture arranged in the planar portion;
a first edge portion extending from the planar portion;

a second edge portion extending from the planar portion and, together with the first edge portion and the planar portion, forming a channel;

an arcuate edge portion:

connecting the first edge portion and the second edge portion;

delimiting the channel;

at least partially surrounding the aperture; and a first tab portion arranged to fix the oil redirection catcher to an axle housing;

a rounded section extending from the first edge portion and the planar portion;

a second tab portion arranged to fix the oil redirection catcher to the axle housing, wherein at least a portion of the second tab portion extends from the rounded section.

2. The oil redirection catcher of claim 1, wherein the first edge portion is longer than the second edge portion.

3. The oil redirection catcher of claim 1, wherein a height of the first edge portion is equal to a height of the second edge portion.

4. The oil redirection catcher of claim 1, wherein at least a portion of the first tab portion is joined to the arcuate edge portion.

5. The oil redirection catcher of claim 1, wherein the channel narrows towards the aperture.

6. The oil redirection catcher of claim 1 wherein the oil redirection catcher is formed by plastic injection molding.

7. An axle assembly, comprising:

an axle housing comprising an oil passage having an inlet and an outlet, and when the axle assembly is installed in a vehicle, the outlet is lower than the inlet;

an oil redirection catcher fixed to the axle housing and arranged to direct oil through the aperture and into the inlet; the oil reduction catcher further comprising:

a planar portion;

an aperture arranged in the planar portion;

a first edge portion extending from the planar portion;

a second edge portion extending from the planar portion and, together with the first edge portion and the planar portion, forming a channel;

an arcuate edge portion:

connecting the first edge portion and the second edge portion;

delimiting the channel;

at least partially surrounding the aperture;

a first tab portion arranged to fix the oil redirection catcher to an axle housing; and an electric motor comprising a rotor with a hollow shaft;

wherein the outlet is aligned with the hollow shaft such that the oil is directed into the hollow shaft.

8. The axle assembly of claim 7 further comprising a sump for collecting the oil, wherein a portion of the oil redirection catcher is disposed in the sump.

9. The axle assembly of claim 7 further comprising a drive gear, wherein rotation of the drive gear in a first rotational direction is arranged to direct the oil into the channel.

10. The axle assembly of claim 9, wherein a portion of the planar portion overlaps a portion of the drive gear.

11. The axle assembly of claim 9, wherein the oil redirection catcher further comprises a rounded section extending from the first edge portion and the planar portion that partially surrounds the drive gear.

12. The axle assembly of claim 9 wherein the drive gear comprises an internal spline arranged for driving connection with an axle shaft.

\* \* \* \* \*